United States Patent
Carruthers et al.

(10) Patent No.: US 7,780,747 B2
(45) Date of Patent: Aug. 24, 2010

(54) APPARATUS AND METHOD FOR HYDROGEN GENERATION FROM GASEOUS HYDRIDE

(75) Inventors: J. Donald Carruthers, Fairfield, CT (US); Jose I. Arno, Brookfield, CT (US)

(73) Assignee: Advanced Technology Materials, Inc., Danbury, CT (US)

(*) Notice: Subject to any disclaimer, the term of this patent is extended or adjusted under 35 U.S.C. 154(b) by 1100 days.

(21) Appl. No.: 10/575,556

(22) PCT Filed: Oct. 14, 2004

(86) PCT No.: PCT/US2004/033915
§ 371 (c)(1),
(2), (4) Date: May 18, 2006

(87) PCT Pub. No.: WO2005/037421
PCT Pub. Date: Apr. 28, 2005

(65) Prior Publication Data
US 2007/0031325 A1  Feb. 8, 2007

(51) Int. Cl.
*C01B 3/04* (2006.01)
(52) U.S. Cl. .............. 48/61; 423/658.2; 422/243
(58) Field of Classification Search .............. 423/658.2; 422/243
See application file for complete search history.

(56) References Cited
U.S. PATENT DOCUMENTS

| | | | |
|---|---|---|---|
| 5,082,481 A | 1/1992 | Barchas et al. | |
| 5,518,528 A * | 5/1996 | Tom et al. | 95/103 |
| 5,653,951 A | 8/1997 | Rodriguez et al. | |
| 6,089,027 A | 7/2000 | Wang et al. | |
| 6,132,492 A * | 10/2000 | Hultquist et al. | 95/45 |
| 6,193,929 B1 | 2/2001 | Ovshinsky et al. | |
| 6,491,866 B1 | 12/2002 | Ovshinsky et al. | |
| 6,746,645 B2 | 6/2004 | Ovshinsky et al. | |
| 7,122,261 B2 | 10/2006 | Morse et al. | |
| 2002/0112479 A1* | 8/2002 | Keefer et al. | 60/651 |

OTHER PUBLICATIONS

Chambers, Alan, et al., Hydrogen Storage in Graphite Nanofibers, J. Phys. Chem. B, May 28, 1998, pp. 4253-4256, vol. 102, No. 22.
Dagani, Ron, Tempest in a Tiny Tube, Chem. & Eng. News, Jan. 14, 2002, pp. 25-28, vol. 80, No. 2.
Tibbetts, Gary G., et al., Hydrogen storage capacity of carbon nanotubes, filaments, and vapor-grown fibers, Carbon, Dec. 2001, pp. 2291-2301, vol. 39, No. 15.

* cited by examiner

*Primary Examiner*—Alexa D Neckel
*Assistant Examiner*—Imran Akram
(74) *Attorney, Agent, or Firm*—Steven J. Hultquist; Intellectual Property/Technology Law; Chih-Sheng Lin

(57) ABSTRACT

An apparatus and method including storage and dispensing vessels to safely store and dispense gaseous hydrides, where the storage and dispensing vessels contain a solid-phase physical sorbent medium having a physically sorptive affinity for gaseous hydrides, and wherein the gaseous hydride is decomposed in the apparatus to generate hydrogen gas. The gaseous hydrides include, but are not limited to, silane, germane, stibine and diborane. The gaseous hydrides decompose spontaneously and/or decomposition is enhanced using surface modified adsorbents. The hydrogen generated by the apparatus may be used in a fuel cell or other hydrogen gas consuming unit.

47 Claims, 4 Drawing Sheets

US 7,780,747 B2

APPARATUS AND METHOD FOR HYDROGEN GENERATION FROM GASEOUS HYDRIDE

FIELD OF THE INVENTION

The instant invention relates generally and specifically to solving the problem of insufficient hydrogen storage capacity in a vessel or tank, while simultaneously permitting the safe and efficient generation of hydrogen fuel. Specifically, this invention relates to an apparatus and method using storage and dispensing vessels that safely store and dispense gaseous hydrides wherein the gaseous hydride is decomposed in the apparatus to generate hydrogen gas.

BACKGROUND OF THE INVENTION

As the world's population expands, so does the use of carbon-based fuels with a concomitant increase in the amount of carbon dioxide released into the atmosphere. Most now accept that the ever-increasing cumulative amount of atmospheric carbon dioxide is warming the earth's atmosphere, causing climate change. Within the last twenty-five years, there has been a recognition that the global energy system must move steadily away from a reliance on carbon-rich fuels whose combustion products include the greenhouse gas carbon dioxide. Furthermore, the extraction and movement of fossil fuels around the globe exacerbates global pollution and is a causative factor in the strategic military struggles between nations.

During the latter portion of the 20$^{th}$ century, combustible fuel alternatives, including natural gas and hydrogen, gained prominence as being environmentally cleaner alternatives to higher-carbon based fuels such as oil. This trend towards lower-carbon fuels, combined with the greater energy efficiency of the modern engines has significantly reduced the amount of carbon released into the atmosphere per combustion unit. However, further decreases in carbon released into the atmosphere are necessary to stave off future catastrophes caused by a runaway greenhouse effect.

Hydrogen is the "ultimate fuel." While the world's oil reserves are depletable, the supply of hydrogen remains virtually unlimited. Hydrogen can be produced from coal, natural gas and other hydrocarbons. Hydrogen can also be produced without the use of fossil fuels, such as by the electrolysis of water using alternative energy sources (e.g., hydroelectric, wind, solar, geothermal, etc.). Furthermore, hydrogen, although presently more expensive than petroleum, is an inherently low cost fuel. Hydrogen has the highest density of energy per unit weight of any chemical fuel and is essentially non-polluting since the main by-product of the oxidation of hydrogen is water. Thus, hydrogen can be a means of solving many of the world's energy related collateral problems, such as climate change, pollution, and a strategic dependency on oil.

To date, the greatest challenge is undoubtedly the need for a cost-effective, on-board hydrogen storage system that will meet the DOE minimum vehicle range of 300 miles within the weight and volume constraints of the vehicle. DOE emphasizes that this is the greatest challenge, since no hydrogen storage technology available today can meet the DOE cost and performance targets even in light of the well-developed hydrogen production and fuel cell technologies (Farrauto, R., ACS Division of Fuel Chemistry, 226$^{th}$ ACS National Meeting, New York, September 2003, paper No. 87, "Catalysts for the Hydrogen Economy"). Although hydrogen can be stored in several ways, e.g., on a solid adsorbent, as a cryogenic liquid, as a compressed gas, or even as a solid chemical hydride, significant barriers must be overcome with each of these methods before the targeted goals can be achieved.

For example, storage of hydrogen as a compressed gas involves the use of large and heavy vessels. In a steel tank of common design at a typical pressure of 136 atmospheres, only about 1% of the total weight is that of the hydrogen gas. This is unacceptable knowing that almost 23 moles of hydrogen gas must be oxidized to release as much energy as the combustion of 1 mole of octane. Storage of hydrogen as a liquid also has disadvantages because liquid hydrogen must be kept extremely cold (below −253° C.) and is highly volatile if spilled. Moreover, liquid hydrogen is energetically expensive to liquefy and maintain in the liquefied state. For example, the losses associated with hydrogen evaporation can be as high as 5% per day. Whether stored as a liquid or gas, hydrogen storage is highly dangerous due to the flammability of the gas.

Various other storage approaches have been tried—adsorption of $H_2$ on inert solids, storing liquid petroleum or methanol followed by reforming to $H_2$, and decomposition of solid hydrides to form $H_2$. Conventional adsorption methods and materials have been shown to be completely inadequate. Although reports in 1997 of high hydrogen adsorption levels on carbon nanotube adsorbents was thought to solve the storage problems (Dillon, A. C., Jones, K M., Bekkedabl, T. A., Kiang, C. H., Bethune, D. S., Heben, M. J., "Storage of Hydrogen in Single-walled Carbon Nanotubes," *Nature* (London), 386(6623), 377-379 (1997); Chambers, A., Park, C., Baker, R. T. K., Rodriguez, N. M., "Hydrogen Storage in Graphite Nanofibers," *J. Phys. Chem.*, 102(22), 42534256 (1998); and U.S. Pat. No. 5,653,951 in the name of Rodriguez, et al. issued Aug. 5, 1997), attempts to recreate the reported work have been disappointing (Dagani, R., "Tempest in a Tiny Tube," *Chem. & Eng. News*, Jan. 14, 2002, p. 25, and Tibbetts, G. G., Meisner, G. P., Olk, C. H., "Hydrogen Storage Capacity of Carbon Nanotubes, Filaments and Vapor-Grown Fibers," *Carbon*, 39(15), 2291 (2001)). McEnaney reviewed the state of the art in a review paper in 2003 and concluded that numerous claims had been made, but there was little convincing evidence that hydrogen could be adsorbed at the levels required (McEnaney, B., "Go Further with $H_2$," *Chem. in Britain*, 39(1), 24 (2003)).

Hydrogen can be stored as a chemically-bonded metal hydride, and much work is underway to demonstrate such technology. This work centers on the use of hydrogen storage alloy materials (see, e.g., U.S. Pat. Nos. 6,746,645, 6,491,866 and 6,193,929 in the name of Ovshinsky et al.). In practice, $H_2$ is physisorbed onto the storage alloy, separates into atomic hydrogen, and bonds with the metal alloy forming metal hydride. To release the hydrogen from the metal hydride, the metal hydride is heated. These technologies, while promising, introduce other challenges, such as poor gravimetric energy density of the fuel (McEnaney, B., "Go Further with $H_2$," *Chem. in Britain*, 39(1), 24 (2003)), and the fact that the solid hydrides must be heated to relatively high temperatures in order to release hydrogen.

The military has identified the need for small portable electric power supplies. The U.S. infantryman, for example, has become extremely efficient through the use of high tech devices; e.g. devices which provide him with communication and night vision capabilities. However, these devices require increasing amounts of portable electric power. Currently available battery packs are heavy and unwieldy and function for only a few hours at a time before requiring recharge. Re-charging devices using fuel cells are under development but these require hydrogen fuel, supplied either from a compressed gas cylinder or more usually, by catalytic treatment of a liquid fuel such as methanol. One downside to the use of methanol is that the catalytic treatment process uses some of the produced hydrogen fuel to convert methanol to hydrogen fuel, which is highly inefficient. However, because it is unfavorable to transport heavy, high pressure compressed hydrogen gas cylinders, methanol is still the re-generator of choice.

U.S. Pat. No. 5,518,528 issued May 21, 1996 in the names of Glenn M. Tom and James V. McManus, describes a gas storage and dispensing system, for the storage and dispensing of gases, which comprises an adsorption-desorption apparatus, for storage and dispensing of a gas, e.g., a hydride gas. The gas storage and dispensing vessel of the Tom et al. patent reduces the pressure of stored sorbate gases by reversibly adsorbing them onto a carrier sorbent medium such as a zeolite or activated carbon material.

More specifically, such storage and dispensing system comprises: a storage and dispensing vessel constructed and arranged for holding a solid-phase physical sorbent medium, and for selectively flowing gas into and out of said vessel; a solid-phase physical sorbent medium disposed in said storage and dispensing vessel at an interior gas pressure; a sorbate gas physically adsorbed on the solid-phase physical sorbent medium; and a dispensing assembly coupled in gas flow communication with the storage and dispensing vessel.

The storage and dispensing vessel of the Tom et al. patent thus embodies a substantial advance in the art, relative to the prior art use of high-pressure gas cylinders. Conventional high pressure gas cylinders are susceptible to leakage from damaged or malfunctioning regulator assemblies, as well as to rupture or other unwanted bulk release of gas from the cylinder if internal decomposition of the gas leads to rapid increasing interior gas pressure in the cylinder.

It would therefore be a significant advance in the art of hydrogen storage to provide an improved storage and dispensing apparatus and decomposition method based on the storage and dispensing vessel of Tom et al., which can adsorb substantial quantities of gaseous hydride and can safely and easily be used without risk to the user.

Other objects and advantages of the invention will be more fully apparent from the ensuing disclosure and appended claims.

SUMMARY OF THE INVENTION

The present invention relates generally to the storage and dispensing of gaseous hydride species and the decomposition of the gaseous hydride species to generate hydrogen gas.

In one aspect, the present invention relates to an apparatus for storing and dispensing a sorbate gas, wherein the sorbate gas undergoes decomposition to form hydrogen gas, said apparatus comprising:
  (a) a storage and dispensing vessel containing the sorbate gas in a physically adsorbed state; and
  (b) a decomposition chamber, said decomposition chamber comprising a decomposition portion and a collection portion, wherein the storage and dispensing vessel is communicatively connected to the decomposition portion, and wherein the decomposition portion and the collection portion are separated by a gas permeable membrane.

In another aspect, the present invention relates to an apparatus for storing, dispensing and regenerating a sorbate gas, said apparatus comprising:
  (a) a storage and dispensing vessel containing the sorbate gas in a physically adsorbed state;
  (b) a decomposition chamber, said decomposition chamber comprising a decomposition portion and a collection portion separated by a gas permeable membrane, said decomposition portion having a modified surface adsorbent disposed therein, wherein the storage and dispensing vessel is communicatively connected to the decomposition portion of the decomposition chamber, and wherein the sorbate gas undergoes decomposition in the decomposition chamber to form a metal and hydrogen gas therein; and
  (c) a hydrogen-containing source communicatively connected to the collection portion of the decomposition chamber.

In yet another aspect, the present invention relates to an apparatus for storing and dispensing a sorbate gas, said apparatus comprising a storage and dispensing vessel containing the sorbate gas, said storage and dispensing vessel comprising:
  (a) a vessel constructed and arranged for holding a solid-phase physical sorbent medium;
  (b) a solid-phase physical sorbent medium disposed in said vessel at an interior gas pressure;
  (c) a sorbate gas physically adsorbed on said solid-phase physical sorbent medium; and
  (d) a dispensing assembly coupled in gas flow communication with the vessel and selectively actuatable for gas dispensing, wherein the dispensing assembly comprises a gas permeable membrane within the vessel,
  wherein at least a portion of the sorbate gas undergoes decomposition in the vessel to form hydrogen gas, and hydrogen gas egresses the vessel through the gas permeable membrane of the dispensing assembly during said gas dispensing.

In a further aspect, the present invention relates to a method for generating hydrogen gas by the decomposition of a sorbate gas, said method comprising:
  (a) desorbing at least a portion of said sorbate gas from a solid-phase physical sorbent medium disposed in a storage and dispensing vessel, said storage and dispensing vessel comprising a solid-phase physical sorbent medium having a physically sorptive affinity for said sorbate gas disposed therein;
  (b) flowing the sorbate gas from the storage and dispensing vessel to a decomposition chamber, and
  (c) decomposing the sorbate gas in the decomposition chamber to generate hydrogen gas.

In a still further aspect, the present invention relates to a method for generating hydrogen gas by the decomposition of a sorbate gas, said method comprising:
  (a) physically adsorbing a sorbate gas into a solid-phase physical sorbent medium having sorptive affinity for said sorbate gas, wherein the solid-phase physical sorbent medium is disposed in a storage and dispensing vessel comprising a dispensing assembly;
  (b) decomposing at least a portion of said sorbate gas physically adsorbed into the solid-phase physical sorbent medium to form hydrogen; and
  (c) flowing the hydrogen gas from the storage and dispensing vessel to a hydrogen gas consuming unit.

Other aspects, features and embodiments of the invention will be more fully apparent from the ensuing disclosure and appended claims.

DETAILED DESCRIPTION OF THE INVENTION AND PREFERRED EMBODIMENTS THEREOF

Figure 1:
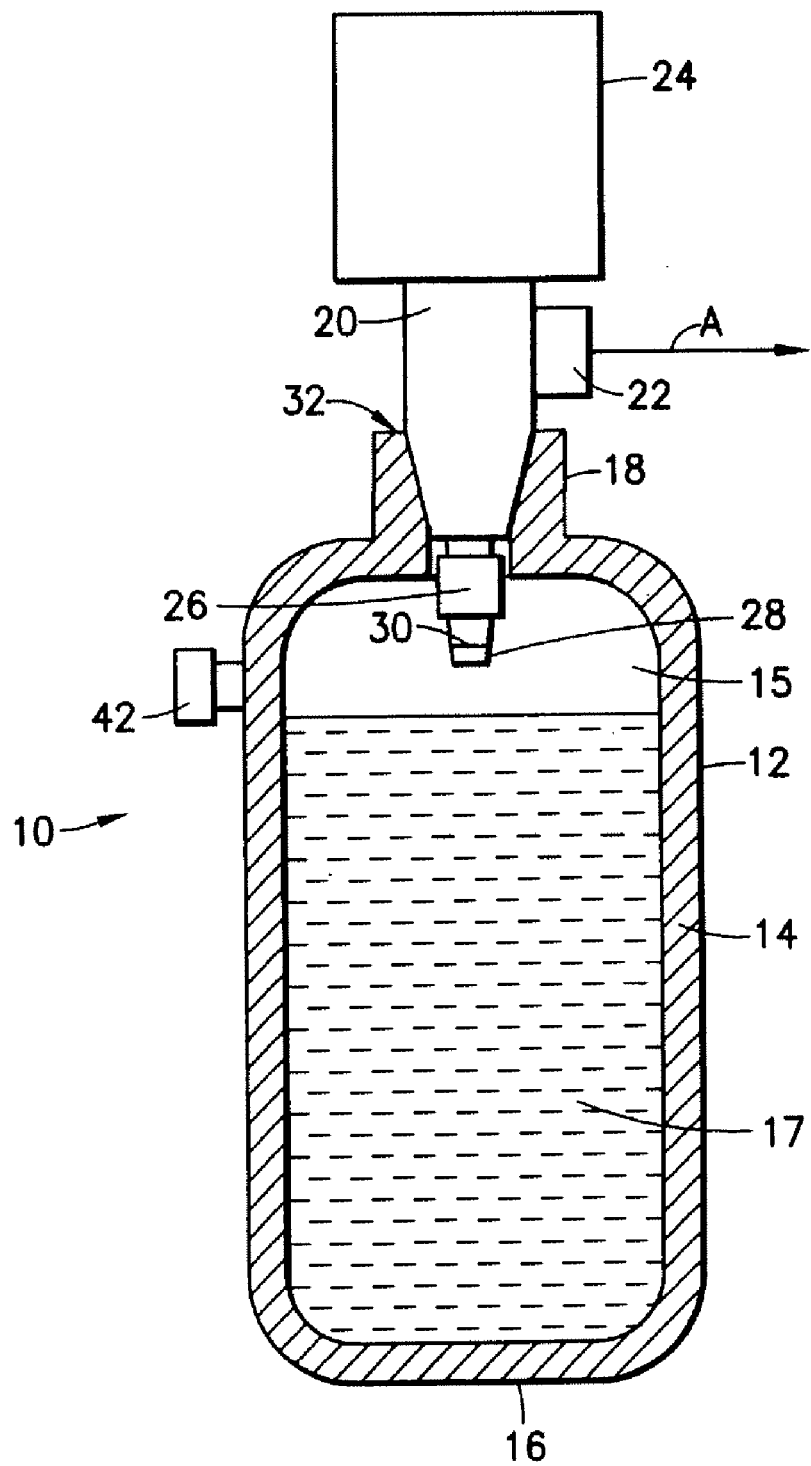
FIG. 1: Schematic cross-portional elevation view of the Wang et al. fluid storage and dispensing system.

The instant invention resolves the problem of insufficient hydrogen storage capacity in a vessel or tank, while simultaneously permitting the safe and efficient generation of hydrogen fuel. Specifically, this invention relates to an apparatus and method using storage and dispensing vessels that safely store and dispense gaseous hydrides, and in which the gaseous hydride is decomposed to generate hydrogen gas.

U.S. Pat. No. 5,528,518, issued May 21, 1996 in the names of Glenn M. Tom and James V. McManus, and U.S. Pat. No. 6,089,027, issued Jul. 18, 2000 in the names of Luping Wang and Glenn M. Tom, are hereby incorporated by reference herein in their entireties.

The invention provides an alternative to conventional hydrogen storage methods. The invention embodies the following operational aspects:

A. Safe storage of a gaseous hydride material in a reduced pressure vessel; and

B. Decomposition of the gaseous hydride in order to generate $H_2$ according to the following general reaction:

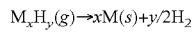
$$M_xH_y(g) \rightarrow xM(s) + y/2H_2$$

where M includes, but is not limited to, Si, Ge, Sb or B; and optionally,

C. An ability to regenerate (in situ or ex situ) the metal product M, back to the gas hydride $M_xH_y$ for storage in a reduced pressure vessel.

These aspects are described individually in detail hereinbelow.

Safe Gaseous Hydride Storage

Many hydride gases, including silane, germane, stibine and diborane, are highly toxic, posing environmental and human safety hazards. Therefore, a major barrier for accepting the concept of in situ generation of hydrogen using a gas hydride precursor are concerns over accidental high pressure gas release of the toxic gaseous hydrides. Towards that end, Advanced Technology Materials, Inc. (Danbury, Conn.) developed and patented the Safe Delivery System (SDS®), which includes a leak-tight gas vessel, such as a gas cylinder, containing the gas to be dispensed, e.g., silane, adsorbed into a sorbent material such as zeolite or other suitable physical adsorbent material (see, Tom et al., U.S. Pat. No. 5,518,528, which is incorporated by reference herein in the entirety).

Extensive investigations have demonstrated the value and safety of the SDS® gas vessel. For example, a conventional phosphine cylinder valve located in a secure cabinet was remotely opened and the maximum gas evolution rate measured during the release period. The release rate of phosphine from the conventional high pressure cylinder attained levels as high as 29,000 ppm/minute. An analogous experiment using an SDS® cylinder containing phosphine resulted in a maximum release rate of only 480 ppb/minute. These tests and nearly ten years of perfectly safe performance have convinced the semiconductor industry that these gases can be handled safely in a routine manner. As many as 40,000 SDS® cylinders are currently in use worldwide.

In addition to the aforementioned safety advantages of storing gases in the adsorbed phase, it has been recently discovered that the risk of deflagration can be reduced when storing deflagration-prone gases, such as germane, in SDS® cylinders (see, U.S. Pat. No. 6,716,271 in the name of Arno et al., issued Apr. 6, 2004, which is incorporated by reference herein in the entirety).

The novel means and method of the present invention for storing and delivering gaseous hydrides, e.g., germane, stibine, silane, phosphine, arsine and diborane, greatly reduces the hazard posed by these gases. The technique involves the adsorption of these gases into a physical adsorbent such as, for example, zeolite 5A. By adsorbing the gas into a zeolite or other suitable solid physical sorbent, the vapor pressure of the gas can be reduced to approximately 0 psig. The release potential from this system is greatly reduced because the driving force of pressure has been eliminated. Collectively, the storage and delivery system may usefully consist of a standard gas cylinder, loaded with solid-phase adsorbent material such as zeolite, and a gas dispensing mechanism including a cylinder valve.

Zeolites are microporous crystalline aluminosilicates of alkali or alkaline earth elements represented by the following stoichiometry:

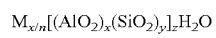
$$M_{x/n}[(AlO_2)_x(SiO_2)_y]_z H_2O$$

where x and y are integers with $y/x \geq 1$, n is the valence of the cation M and z is the number of water molecules in each unit cell. Zeolite 5A has approximately $2.5 \times 10^{21}$ hydride adsorption sites per gram. For example, a liter of zeolite will adsorb 100 grams of phosphine and 220 grams of arsine at 25° C. and 1 atmosphere.

A particularly preferred solid-phase physical sorbent medium has a pore size in the range of from about 4 to about 13 Å. Examples of such composition include 5A molecular sieves, and preferably a binderless molecular sieve. Other solid-phase physical sorbent mediums include crystalline aluminosilicates, carbon molecular sieves, silica, alumina, macroreticulate polymers, kieselguhr, carbon, etc. For example, a liter of carbon will adsorb 140 g of silane at atmospheric pressure. The characteristics of the adsorbent used may be readily determined by one skilled in the art. For example, the pore size distribution of the adsorbent may be optimized to yield optimum storage and desorption rates. In addition, the adsorbent media may be pelletized, beaded, or a solid monolith block. The adsorbent may alternatively be channelized (see Tom et al., U.S. Pat. No. 6,764,755 issued Jul. 20, 2004, which is incorporated by reference herein in the entirety).

Because of the "unstable" nature of some of the hydrides, adsorbents may need to be passivated to prevent premature or uncontrolled decomposition during storage. For example, boric acid treatment is a well-known method for oxidation suppression in carbon materials (McKee, D. W., Spiro, C. L., Lamby, E. J., "The Effects of Boron Additives on the Oxidation Behavior of Carbons," Carbon, 22(6), 507 (1984)), where it is believed to involve bonding of the $(BO_3)_n$ chain to the carbon sites of the {10$\bar{1}$1} face of graphite.

Alternatively, the surface of the adsorbent may be modified prior to introduction of the adsorbent into the storage and dispensing vessel to enhance decomposition. With regards to surface modification, it is believed that the passivating effect, i.e., the passivation of the adsorbent in the storage vessel to prevent premature or uncontrolled decomposition during storage, observed in our own data is good evidence for the importance of carbon edge-site chemistry in gaseous hydride decomposition. Specifically, the development of higher-rate decomposition catalysts produced by increasing the number of carbon sorbent active edge sites is proposed. Empirical determinations show the occurrence of enhanced decomposition rates after doping the carbon sorbent material with phosphoric acid, implying a synergistic mechanism involving carbon edge sites and phosphorous. This enhanced decomposition by a phosphorus-containing compound was unexpected in view of McKee et al., who previously reported that graphite oxidation was inhibited by phosphorus additives (McKee, D. W., Spiro, C. L., Lamby, E. J., "The Inhibition of Graphite Oxidation by Phosphorus Additives," *Carbon*, 22(3), 285-290 (1984)). By systematically manipulating both edge-site concentration and the type, amount, and dispersion of inorganic dopants in the carbon sorbent, an effective catalyst formulation for rapid, on-demand hydrogen production from the gaseous hydride source may be obtained.

Figure 3:
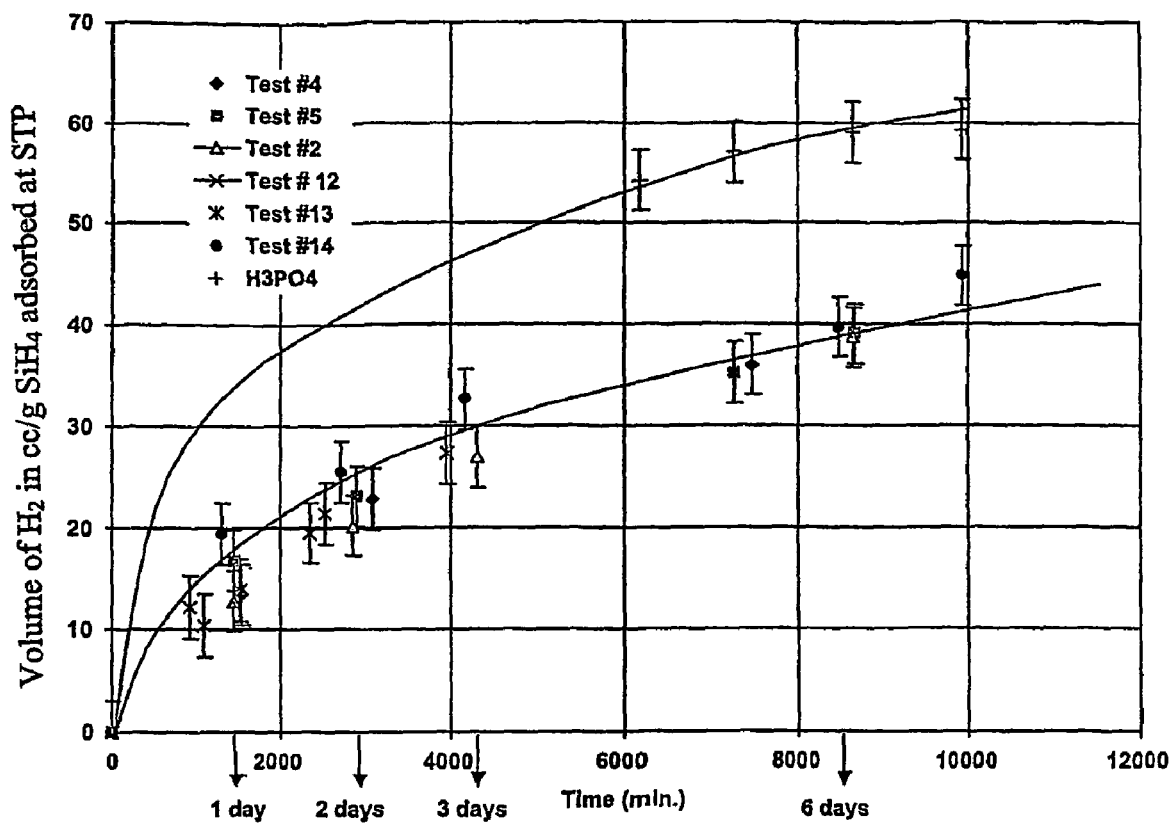
FIG. 3: Silane decomposition to hydrogen gas and silicon solid on untreated carbon (various tests) and $H_3PO_4$-treated carbon.

For example, FIG. 3 illustrates the decomposition of silane as a function of carbon site functionalization, as originally performed during a study of undesirable decomposition during storage. It can be seen that the carbon sorbent doped with the $H_3PO_4$ material (+) greatly enhances the decomposition of silane relative to undoped carbon sorbents. After six days, the volume of hydrogen produced during the decomposition of silane in the presence of $H_3PO_4$-doped carbon sorbent was 50% greater than the volume of hydrogen produced in the presence of undoped carbon sorbent.

Importantly, the decomposition of gaseous hydrides may be either suppressed or enhanced depending on which doping agent is applied to the carbon sorbent material prior to gaseous hydride loading. For example, boric acid doping of the carbon sorbent material reduces the rate of decomposition while phosphoric acid doping of the same sorbent doubles the rate of hydrogen gas production relative to that of un-doped carbon sorbent. Thus, "surface modified adsorbent" as used herein can represent the enhancement or suppression of gaseous hydride decomposition in the presence of doped sorbent material, depending on the particular dopant used.

In addition to the safety advantages, the storage technology of the SDS® vessel allows for a greater quantity of delivered gas. Approximately 5-20 times more gaseous hydride may be stored in the SDS® vessel relative to conventional high pressure cylinders. Since more gaseous hydride is delivered by the storage and delivery system, fewer cylinder changes are required. Since most accidents with gases occur during cylinder changes, safety is further improved.

Typically, the solid-phase physical sorbent medium chosen reduces the vapor pressure of the gaseous hydride to $\leq 1$ atmosphere, and the vapor is selectively dispensed by pressure differential desorption of at least a portion of the sorbate gas from the sorbent material. In addition, the vessel may in some instances advantageously employ a heater operatively arranged in relation to the storage and dispensing vessel for selective heating of the solid-phase physical sorbent medium, to effect thermally-enhanced desorption of at least a portion of the sorbate gas from the solid-phase physical sorbent medium. Since the storage and delivery vessel of Tom et al. preferably operates in the sub-atmospheric regime, the pressure regulator assembly may be exteriorly located.

In the alternative, when higher storage pressures are required, the fluid is a liquid, or conditions warrant enhanced safety, at least one pressure regulator may be disposed at or within the vessel to retain fluid in the vessel, for example Advanced Technology Materials, Inc. (Danbury, Conn., USA) VAC™ cylinder (see, e.g., Wang, et al. U.S. Pat. No. 6,089,027, which is incorporated by reference herein in the entirety). Preferably, such elements are interiorly disposed to minimize the possibility of impact and environmental exposure during use, and to minimize the leak path of the contained fluid from the vessel. When the pressure regulator is interiorly disposed, the vessel may utilize a single weld or seam at the outlet port, to seal the vessel.

FIG. 1 is a schematic cross-portional, elevation view of the Wang et al. storage and gas dispensing system 10, which may be used to safely store gaseous or liquid hydride according to the present invention. The fluid storage and gas dispensing system 10 includes a storage and dispensing vessel 12 including a cylindrical side wall 14, a bottom floor 16 and an upper neck portion 18, defining an enclosed interior volume 15 holding the gaseous hydride and adsorbent material 17. Illustrative gaseous hydrides include germane, stibine, silane, diborane, etc. When the hydride is a liquid, the storage and dispensing vessel 12 is devoid of adsorbent material (the enclosed interior volume 15 of the vessel 12 holds liquid hydride only).

Disposed in the upper neck portion 18 of the vessel 12 is a valve head assembly comprising valve 20 communicating with valve outlet 22, from which vapor is dispensed from the vessel in the direction indicated by arrow A. The valve 20 is shown with an associated actuator 24, which may be of any suitable type (electrical, pneumatic, etc.) as desired in the given end use application of the invention. Alternatively, the valve 20 may be manually actuated, or provided with other flow control means.

The valve 20 is joined in gas flow communication with the pressure regulator 26, which is of a conventional type employing a poppet element which may for example be spring biased in a closed condition and wherein the poppet is subject to displacement when the pressure differential across the poppet element exceeds a certain level. The pressure regulator 26 may for example be set to a subatmospheric, atmospheric or superatmospheric pressure value. The specific pressure level is chosen with respect to the fluid contained in the vessel, as appropriate to the storage and dispensing operation.

Optionally, coupled with the pressure regulator 26 is a phase separator 28, including a membrane element 30, which is permeable to gas or vapor, e.g., hydrogen, deriving from the decomposing fluid stored therein, but is impermeable to the fluid itself, e.g., gaseous hydride. Similarly, the Tom et al. vessel disclosed hereinabove may also optionally have a selective hydrogen membrane disclosed within the gas dispensing mechanism. Potential membrane compositions are described in more detail hereinafter.

When it is desired to dispense gas from the vessel 12, the valve actuator 24 is actuated to open valve 20, thereby permitting gas or vapor to flow through the permeable membrane 30, the pressure regulator 26 and the valve 20, for egress from the valve head dispensing assembly through outlet 22. During gas dispensing, the fluid pressure regulator will maintain the pressure of the gas being dispensed at the set point pressure level.

The regulator is a flow control device, which can be set at a predetermined pressure level to dispense gas or vapor from the cylinder at such pressure level. The pressure level set point may be superatmospheric, subatmospheric or atmospheric pressure, depending on the dispensing conditions, and the mode of gas discharge from the vessel. The storage and dispensing vessel described herein may optionally have check valves, which prevent the potentially dangerous situation where air diffuses back into the vessel containing the gaseous hydride.

Like the Tom et al. vessel, dispensing of gases from the Wang et al. vessel may be effectuated by pressure differentials or selective heating of the solid-phase physical sorbent medium to effect desorption of at least a portion of the sorbate gas from the solid-phase physical sorbent medium.

The storage and dispensing vessels of the Tom et al. and Wang et al. patents thus embody a substantial advance in the art, relative to the prior art use of high-pressure gas cylinders. Conventional high pressure gas cylinders are susceptible to leakage from damaged or malfunctioning regulator assemblies, as well as to rupture or other unwanted bulk release of gas from the cylinder if internal decomposition of the gas leads to rapid increasing interior gas pressure in the cylinder.

Hydride Decomposition

A recent discovery has demonstrated that silane gas ($SiH_4$), stored as an adsorbed-phase in a nano-composite medium at sub-atmospheric pressures, can self-decompose at a near constant rate, producing $H_2$ and solid silicon. This decomposition occurs at room temperature without the need for external heat or elevated pressure. This exciting, new hydrogen storage concept involves, therefore, the release of hydrogen via the decomposition of a gaseous hydride stored in a nano-composite, adsorbed-phase containing vessel according to the reaction:

$$M_xH_y(g) \rightarrow xM(s) + y/2H_2 \quad (1)$$

where M includes, but is not limited to, Si, Ge, Sb or B.

The thermodynamic tendency for this reaction to occur at room temperature is indicated by the Gibbs free energy of formation of the hydride at 298K, $\Delta G_f$, wherein the decomposition of certain hydrides is more thermodynamically favored than others. Stibine ($SbH_3$, $\Delta G°_f=+147.8$ kJ/mole), germane ($GeH_4$, $\Delta G°_f=+113.4$ kJ/mol), diborane ($B_2H_6$, $\Delta G°_f=+86.7$ kJ/mol), and silane ($SiH_4$, $\Delta G°_f=+56.9$ kJ/mole) are gaseous hydrides which, subject to kinetic limitations, can spontaneously decompose at room temperature. On the other hand, the decomposition of methane ($CH_4$, $\Delta G°_f=-50.84$ kJ/mol) is very unfavorable under these conditions. Of these gases, silane stands out as the leading candidate based on safety and abundance considerations.

Decomposition rates of the gaseous hydrides may be modulated by heating the vessel to increase kinetic decomposition rates, pressurizing the vessel to increase kinetic rates, using some of the generated hydrogen to cool or heat up the vessel to slow down or accelerate hydrogen generation, and/or modifying the surface sites of the adsorbent, e.g., doping the carbon sorbent with phosphoric acid, to catalyze decomposition, or boric acid, to suppress decomposition.

Suitable gaseous hydride materials generate hydrogen upon decomposition. Preferably, the by-products include a solid phase metal which is regenerable back to its gaseous hydride form. Optimum materials should form multiple hydrogen molecules for every parent gaseous hydride. At the same time, toxicity and reactivity of the gaseous hydride and its by-products should be minimal. A final consideration for extensive world-wide use is availability. Materials suitable for use in the broad practice of the invention include, silane, ammonia, boranes, hydrocarbons and other suitable Group IVA-VIA hydrides.

Silane can be adsorbed at ambient pressure on high capacity carbon monoliths at a level of 140 g/L. Under conditions of stoichiometric decomposition, the amount of silane necessary for 4.5% hydrogen storage is 286 g/L. The advantages offered by silane (e.g., it is a commodity chemical, less toxic than the other candidate compounds, and capable of safe delivery), far outweigh its disadvantages. Disilane or higher-order silanes can also be used. Suitable Group IVA-VIA hydrides include, but are not limited to ammonia ($NH_3$), germane ($GeH_4$), stibine ($SbH_3$), arsine ($AsH_3$), stanane ($SnH_3$), bismuth hydride ($BiH_3$), phosphine ($PH_3$), selenium hydride ($SeH_2$) and telerium hydride ($TeH_2$). Ammonia is less reactive than silane and therefore may require a catalyst. Advantageously though, the byproducts of the ammonia decomposition are nitrogen and hydrogen, which are easily separated. Boranes (diborane, pentaborane, decaborane) form elemental boron and hydrogen upon decomposition, whereby the boron metal that can be oxidized or re-hydrided. Hydrocarbons are less reactive than silanes and decompose to form carbon and hydrogen and the decomposition may require a catalyst and energy input.

Figure 2A:
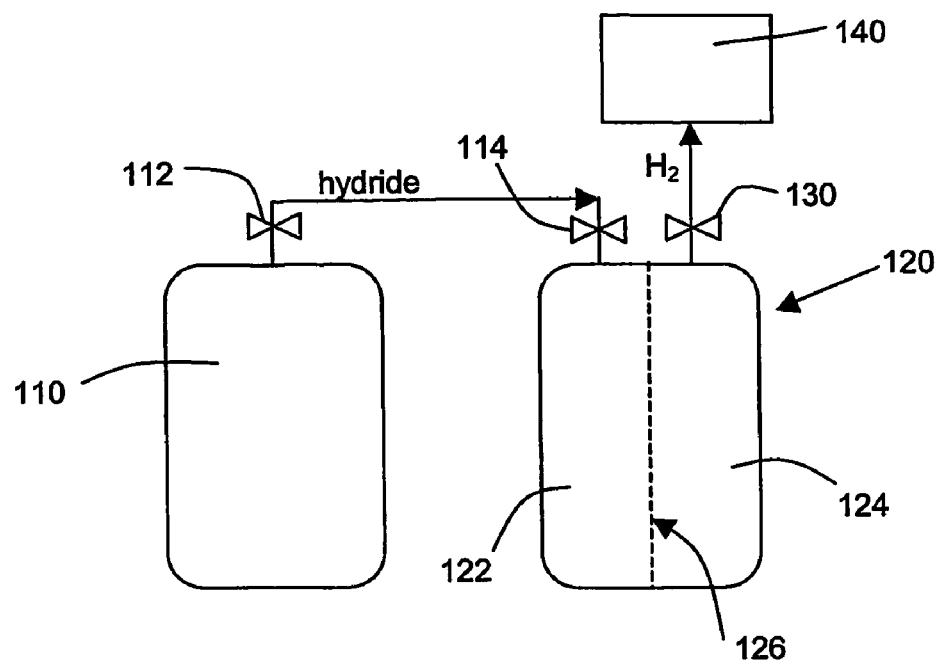
FIG. 2A: Schematic of an embodiment of the gaseous hydride storage and decomposition system disclosed herein.

FIG. 2A illustrates an embodiment of the present invention based on the observation that decomposition of the gaseous hydrides may be enhanced by surface modification, i.e., manipulating the carbon edge-site concentration, of the adsorbent material. Storage and dispensing vessel 110, e.g., the Tom et al., the Wang et al., or variations thereof, is situated upstream of decomposition chamber 120. Situated between the vessel 110 and the decomposition chamber 120 are a series of valves 112, 114, for example, pressure regulating valves, check valves, shut-off valves, isolation valves, over-pressure relief valves, mass-flow control valves, etc. The valves 112, 114 may be manually or automatically actuatable. In addition, pressure switches and/or mechanical regulators can be used throughout the system to prevent backflow and to control the generation of hydrogen, thus ensuring safe operation of the system.

The decomposition chamber 120 is divided into at least two different portions, a decomposition portion 122 and collection portion 124, said decomposition portion 122 and collection portion being bisected by a gas separation membrane 126. The decomposition portion 122 has disposed therein a quantity of surface modified adsorbent, e.g., $H_3PO_4$-doped carbon.

The gas separation membranes 126 used to perform the hydrogen/gaseous hydride separation are hydrogen-selective, that is, they permeate hydrogen preferentially over gaseous hydrides and all other gases in the mix. The membrane used is a polymeric membrane based on molecular size or polarity and is selective for hydrogen over gaseous hydrides, which creates a gaseous hydride-depleted, hydrogen-enriched permeate stream. Representative references describing membrane separation processes such as this include U.S. Pat. Nos. 4,362,613 and 4,367,135 to Monsanto, U.S. Pat. No. 4,548,619 to UOP, U.S. Pat. No. 5,053,067 to L'Air Liquide, U.S. Pat. No. 5,082,481 to Lummus Crest, U.S. Pat. No. 5,157,200 to Institut Francais du Petrole, and U.S. Pat. No. 5,689,032 to Krause/Pasadyn. Polymers which may be suitable for the polymeric membranes and which may exhibit suitable selectivities for the permeation of hydrogen as compared to the permeation of gaseous hydrides, can be substituted or unsubstituted polymers and for example, may be selected from polysulfones; poly(styrenes), including styrene-containing copolymers such as acrylonitrile-styrene copolymers, styrene-butadiene copolymers and styrene-vinylbenzylhalide copolymers; polycarbonates; cellulosic polymers, such as cellulose acetate, cellulose propionate, ethyl cellulose, methyl cellulose, nitrocellulose, etc.; polyamides and polyimides, including aryl polyamides and aryl polyimides; polyethers, poly(arylene oxides) such as poly (phenylene oxide) and poly(xylylene oxide); poly(esteramide-diisocyanate); polyurethanes; polyesters (including polyarylates), such as poly(ethylene terephthalate), poly(alkyl methacrylates, poly(alkyl acrylates), poly(phenylene terephthalate), etc.; polysulfides; poly(siloxanes); polymers from monomers having alpha-olefinic unsaturation other than mentioned above such as poly(ethylene), poly(propylene), poly(butene-1), poly(4-methyl pentene-1), polyvinyls, e.g., poly(vinyl chloride), poly(vinyl fluoride), poly(vinylidene chloride), poly(vinylidene fluoride), poly(vinyl alcohol), poly(vinyl esters) such as poly(vinyl acetate) and poly(vinyl propionate), poly(vinyl pyridines), poly(vinyl pyrrolidones), poly(vinyl ethers), poly(vinyl ketones), poly(vinyl aldehydes) such as poly(vinyl formal) and poly(vinyl butyral), poly(vinyl amines), poly(vinyl phosphates), and poly(vinyl sulfates); polyacetal; polyallyls; poly(benzobenzimidazole), polyhydrazides; polyoxadiazoles; polytriazoles; poly(benzimidazole); polycarbodiimides; polyphosphazinesl; etc., and interpolymers, including block interpolymers containing repeating units from the above, and grafts and blends containing any of the foregoing. Typical substituents providing substituted polymers include halogens such as fluorine, chlorine and bromine; hydroxyl groups; lower alkyl groups; lower alkoxy groups; monocyclic aryl; lower acyl groups and the like. A preferred gas separation membrane is Nafion®, which are a perfluorosulfonic acid/PTFE copolymer in the acidic form.

In operation, desorption of the gaseous hydride stored in the storage and dispensing vessel 110 is effectuated by a pressure differential, i.e., the pressure downstream of the vessel is less than the pressure within the vessel, or alternatively, desorption is thermally-enhanced whereby the vessel and/or the contents contained therein are heated by a heating means. The desorbed gaseous hydride from the storage and dispensing vessel 110 flows into the decomposition portion 122 of the decomposition chamber 120, where decomposition of the hydride to form the metal M and $H_2$ occurs.

The hydrogen gas generated during the decomposition reaction preferentially passes through the gas separation membrane 126 to the collection portion 124 of the decomposition chamber 120. Passage of hydrogen gas from the decomposition portion 122 to the collection portion 124 is effectuated by concentration and/or pressure differentials, which are well known in the membrane arts. When valve 130 is open, hydrogen in the collection portion 124 of the decomposition chamber 120 passes through to the fuel cell 140. Optionally, the decomposition chamber 120 may act as a holding chamber, wherein the hydrogen gas is stored in the collection portion 124 until a pre-determined pressure threshold is reached. This serves to allow immediate gas flow to the fuel cell on demand and to shorten the "waiting-period" associated with decomposition. The holding chamber may further comprise flow-regulating devices, such as a mass flow controller, to achieve reproducible delivery of $H_2$ compounds into the fuel cell. A pump or venturi (not shown) may be disposed between the decomposition chamber 120 and the storage and dispensing vessel 110 and/or between the decomposition chamber 120 and the fuel cell 140 to facilitate movement of gases from the vessel 110 to the decomposition chamber 120 and/or from the collection portion 124 to the fuel cell.

As previously introduced, one downside of many gas storage operations is the continual decomposition of the silane or germane gas to hydrogen and silicon/germanium during storage on non-doped sorbent materials, even at room temperature. This detriment is advantageously addressed in the practice of the present invention by using the spontaneous decomposition system described hereinabove as a hydrogen source. Towards that end, in yet another embodiment, the decomposition chamber 120 is devoid of surface modified adsorbent in the decomposition portion 122 (i.e., no adsorbent is present, or alternatively undoped adsorbent is present in the decomposition portion). In this embodiment, the hydride spontaneously decomposes in the storage and dispensing vessel 110, the decomposition portion 122 and/or the line connecting the two, and the hydrogen gas passes through the membrane as described in the previous embodiment. For example, the decomposition of the gaseous hydride stored in the storage and dispensing vessel 110 may be modulated by adding or removing energy to the vessel 110 (by heat, pressure, friction, etc) while valves 112 and/or 114 are closed. Hydrogen, to a large extent, would not be preferentially adsorbed onto the adsorbent media, and thus remains in the headspace of the vessel. Following the opening of valves 112 and 114, the headspace gas is extracted out. Any gaseous hydride removed together with the hydrogen gas can be separated from the gas stream using the gas separation membrane 126 or other chemical filter. Alternatively, the sorbent material contained in the storage and dispensing vessel 110 may include the surface modified adsorbent.

Another embodiment includes the positioning of a second holding chamber between the decomposition chamber and the fuel cell (not shown). In this embodiment, the second holding chamber is separate from the decomposition chamber 120 thereby ensuring that the concentration or pressure differential across the gas separation membrane 126 is maximized. Optionally, a pump or a venturi (not shown) may be disposed between the decomposition chamber 120 and the fuel cell to facilitate movement of hydrogen from the collection portion 124 to the second holding chamber.

The storage and dispensing vessel 110, decomposition chamber 120 and the gas permeable membrane 126 may be of any size, shape and/or configuration depending on the circumstances and conditions of use, e.g., size of the fuel cell and the amount of hydrogen needed per unit time, as readily determined by one of skill in the art. The material construction of the apparatus is also readily determined by one skilled in the art.

In a particularly preferred embodiment, the storage and dispensing vessel is a light-weight, small volume, gas storage vessel rated to approximately 50 psig containing silane at sub-ambient pressure, said silane being adsorbed onto a doped carbon sorbent, e.g., doped with phosphoric acid. The pressure of the adsorbed silane is preferably sub-atmospheric to minimize exposure of toxic silane to the user in the event of an accidental release. The gas dispensing mechanism would incorporate a selective hydrogen separation membrane to prevent discharge of silane gas but allow hydrogen to egress from the vessel to a small, portable fuel cell. An individual, e.g., a soldier, carrying the storage and dispensing vessel incorporated into a small fuel cell system would have electric power to continually charge a small battery system. Following complete discharge of the silane from the vessel, the vessel may be opened to the atmosphere allowing silicon oxidation to environmentally benign silica for proper disposal.

Material Regeneration:

Once the gaseous hydride has been fully utilized to generate hydrogen, the non-gaseous metal M remains in the decomposition portion 122 of the decomposition chamber 120. In a further embodiment of the present invention, at least a portion of the metal M, e.g., Si, Ge, Sb and B, may be recycled back to the gaseous hydride form in order to complete the material lifecycle, i.e., "re-hydrided." This is especially important when the storage and dispensing vessel 110 is of a volume that is easily transportable, e.g., by humans or by automobile, but has a limited amount of gaseous hydride available for use.

Regeneration can be accomplished in situ or ex situ. Unlike current reforming technologies used to generate hydrogen, which liberate the second element into the environment, e.g., carbon as a carbon oxide, this technology aims to confine the metal M for conversion back to a gaseous hydride species. From a thermodynamic point of view, the enthalpy required for formation of the silane from Si and $H_2$ is +34.3 kJ/mole while the heat of combustion of the generated hydrogen reaches −483.6 kJ, a net overall benefit of −449 kJ.

Figure 2B:
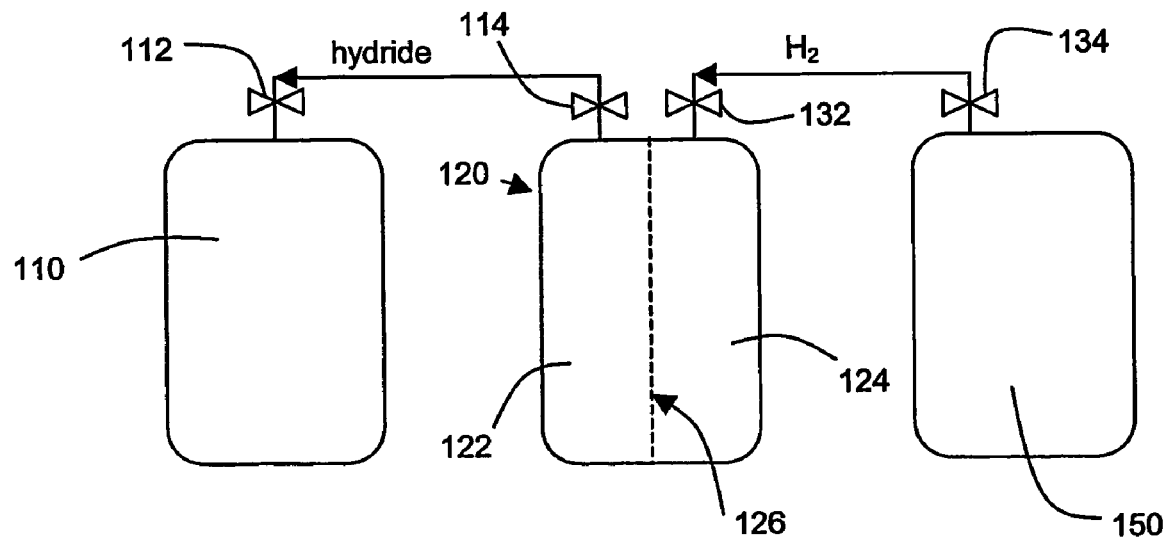
FIG. 2B: Schematic of an embodiment for regenerating the gaseous hydride storage and dispensing vessel as disclosed herein.

FIG. 2B illustrates an embodiment of the material regeneration invention wherein at least a portion of the metal M remaining following the decomposition reaction may be regenerated for reuse. As used herein, "re-hydrided" is defined as the regeneration of the metal M using hydrogen gas to form stoichiometrically or non-stoichiometrically complete gaseous hydrides containing said metal. The storage and dispensing and decomposition components are numerically labeled the same as in FIG. 2A. In FIG. 2B, a hydrogen-containing source 150 is communicatively connected to the collection portion 124 of the decomposition chamber 120. Situated between the hydrogen-containing source 150 and the decomposition chamber 120 are a series of valves 132, 134, for example, pressure regulating valves, check valves, shut-off valves, isolation valves, over-pressure relief valves, mass-flow control valves, etc. The valves 132, 134 may be manually or automatically actuatable. In addition, pressure switches and/or mechanical regulators can be used throughout the system to prevent backflow and to control the generation of hydrogen, thus ensuring safe operation of the system. A pump or venturi (not shown) may be disposed between the decomposition chamber 120 and the storage and dispensing vessel 110 and/or between the decomposition chamber 120 and the hydrogen-containing vessel to facilitate movement of gases from the source 150 to the decomposition chamber 120 and/or from the decomposition chamber 120 to the storage and dispensing vessel 110.

Notably, although the vessels, chambers and sources 110, 120 and 150 are schematically shown to be an equal volume, it should be appreciated that the size, shape and/or configuration of the individual vessels, chambers, sources and membranes may vary depending on the circumstances and conditions of use, as readily determined by one skilled in the art. For example, the storage and dispensing vessel 110 may be of a size that it is portable by humans, e.g., a foot soldier, however, the hydrogen-containing source 150 may be a vessel that is so large as to be utilized for regeneration purposes only. Alternatively, the hydrogen-containing source 150 is not a vessel per se, but represents a conventional hydrogen-generating system, e.g., water electrolysis using electricity, as known by those skilled in the art. In yet another alternative, the hydrogen-containing source 150 contains another hydride, e.g., a higher order hydride such as decaborane, which is able to donate some of its hydrogen atoms to regenerate the leftover metal. As such, as defined herein "hydrogen-containing source" may be a vessel containing hydrogen in the form of hydrogen gas or a higher-order hydride or a generating system that generates hydrogen gas.

In operation, hydrogen from the hydrogen-containing source 150 flows into the collection portion 124 of the decomposition chamber 120. Hydrogen entering the collection portion 124 passes through the gas separation membrane 126 (as described hereinabove) to the decomposition portion 122 (which in this embodiment is a regeneration portion), where the hydrogen reacts with at least a portion of the metal M to form the gaseous hydride, according to the following reaction:

$$xM(s)+y/2H_2(g) \rightarrow M_xH_y(g) \qquad (2)$$

Figure 4:
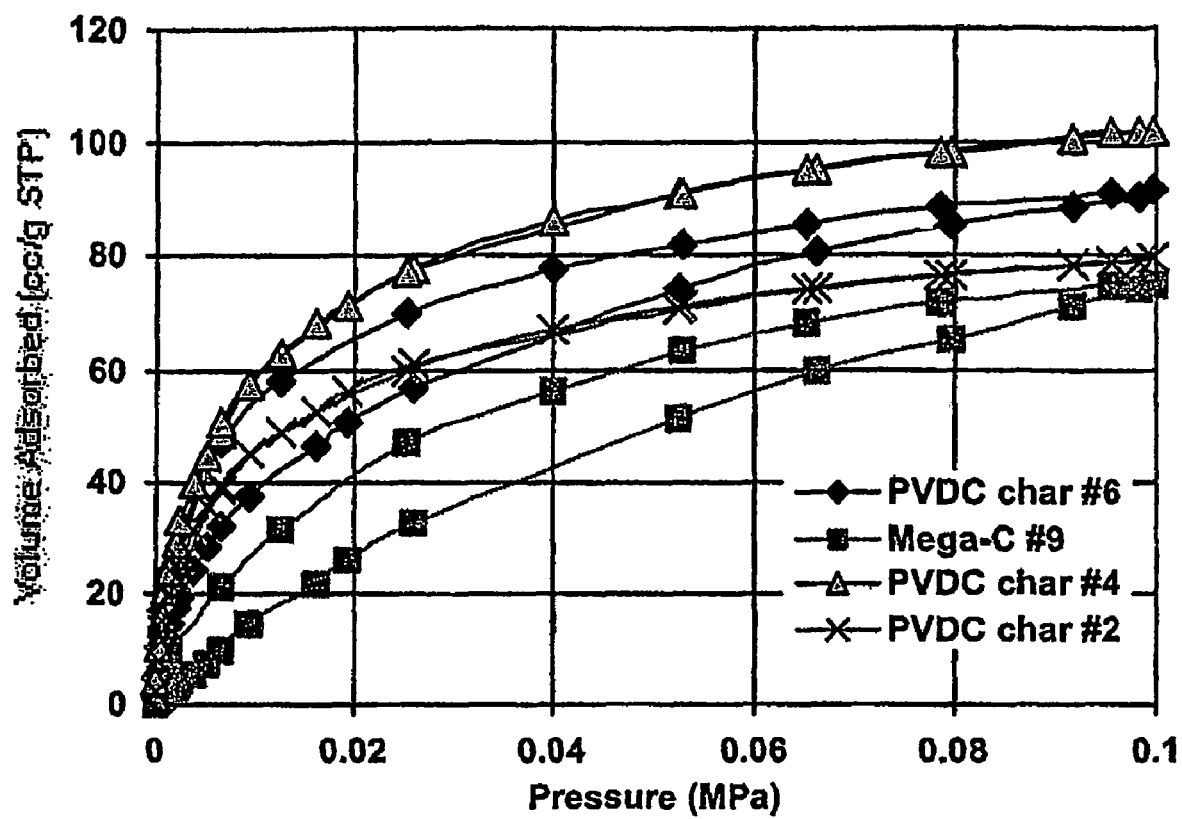
FIG. 4: Silane adsorption/desorption isotherms at 294.2K.

Thereafter, the gaseous hydride formed in the decomposition portion 122 flows into the storage and dispensing vessel 110, where it adsorbs onto the sorbent material contained therein. The time of regeneration is readily determinable by one skilled in the art using known volumes, gas flows and the adsorption isotherm of the gaseous hydride onto the specific sorbent material disposed within the storage and dispensing vessel 110 (see, e.g., FIG. 4, illustrating the adsorption of silane onto various carbon sorbents). Following the required amount of regeneration, the storage and dispensing vessel 110 is "full" of gaseous hydride and can be used to provide hydrogen to a fuel cell again. It is to be appreciated that a "full" storage and dispensing vessel does not necessarily mean that the vessel is full in a theoretical sense, i.e., based on the number of available adsorption sites, but rather no more gaseous hydride will adsorb onto the adsorbent material at the specific conditions of adsorption, i.e., pressure, temperature, etc.

In yet another alternative, a halogen gas is used to extract the metal M contained in the decomposition chamber 122 to generate metal halides according to the reaction:

$$xM(s)+y/2Cl_2 \rightarrow M_xCl_y(g) \qquad (2)$$

Subsequently, the halogen atoms are displaced via reaction with hydrogen gas (with heat, pressure, or catalysts) to form the hydride according to the following reaction:

$$M_xCl_y(g)+y/2H_2(g) \rightarrow M_xH_y(g)+y/2Cl_2(g) \qquad (3)$$

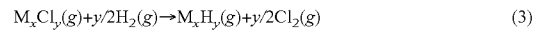

During regeneration, heat and/or pressure may be used to facilitate conversion of at least a portion of the metal back to the gaseous hydride.

While the invention has been described herein with reference to various specific embodiments, it will be appreciated that the invention is not thus limited, and extends to and encompasses various other modifications and embodiments, as will be appreciated by those ordinarily skilled in the art. Accordingly, the invention is intended to be broadly construed and interpreted, in accordance with the ensuing claims.

What is claimed is:

1. An apparatus for storing and dispensing gas, comprising:
   (a) a storage and dispensing vessel for containing a gaseous hydride that is decomposable to produce hydrogen gas and a solid decomposition product, and wherein the gaseous hydride undergoes decomposition to form hydrogen gas; and
   (b) a decomposition chamber, said decomposition chamber comprising a decomposition portion and a collection portion, wherein the storage and dispensing vessel is connected in gas flow communication to the decomposition portion of the decomposition chamber, wherein the decomposition portion and the collection portion are separated by a hydrogen gas permeable membrane, wherein the decomposition portion contains a phosphoric acid-doped carbon adsorbent effective to decompose said gaseous hydride to produce hydrogen gas, and a solid decomposition product, and wherein the collection portion of the decomposition chamber is arranged to receive hydrogen gas that passes through the hydrogen gas permeable membrane, and to dispense the hydrogen gas for use.

2. The apparatus of claim 1, wherein the storage and dispensing vessel comprises:
   (a) a vessel constructed and arranged for holding a solid-phase physical sorbent medium, and for selectively flowing gaseous hydride into and out of said vessel;
   (b) a solid-phase physical sorbent medium disposed in said vessel at an interior gas pressure;
   (c) a gaseous hydride physically adsorbed on said solid-phase physical sorbent medium; and
   (d) a dispensing assembly coupled in gas flow communication with the vessel;
wherein at least a portion of the gaseous hydride desorbs from the solid-phase physical sorbent medium under dispensing conditions to yield desorbed gaseous hydride for flow of said desorbed gaseous hydride through the dispensing assembly.

3. The apparatus of claim 1, wherein the gaseous hydride comprises a hydride selected from the group consisting of silane, germane, stibine and diborane.

4. The apparatus of claim 1, wherein the gaseous hydride comprises silane.

5. The apparatus of claim 2, wherein the solid-phase physical sorbent medium disposed in said vessel comprises a material selected from the group consisting of silica, carbon molecular sieves, alumina, macroreticulate polymers, kieselguhr, carbon, and aluminosilicates.

6. The apparatus of claim 1, wherein the hydrogen gas permeable membrane is selective for hydrogen over the gaseous hydride.

7. The apparatus of claim 1, wherein the hydrogen gas permeable membrane comprises perfluorosulfonic acid.

8. The apparatus of claim 1, further comprising a fuel cell communicatively connected to the collection portion of the decomposition chamber, wherein the fuel cell is positioned downstream of the collection portion of the decomposition chamber.

9. The apparatus of claim 2, wherein the dispensing assembly comprises at least one gas regulator positioned between the storage and dispensing vessel and the decomposition chamber.

10. The apparatus of claim 1, wherein the dispensing assembly comprises at least one gas regulator disposed within the vessel.

11. The apparatus of claim 2, wherein the interior gas pressure is subatmospheric.

12. The apparatus of claim 2, wherein the interior gas pressure is super atmospheric.

13. The apparatus of claim 2, further comprising a heater operatively arranged in relation to the vessel for selective heating of the solid-phase physical sorbent medium, to effect thermally-enhanced desorption of at least a portion of the gaseous hydride from the solid-phase physical sorbent medium.

14. The apparatus of claim 2, wherein the vessel is constructed and arranged to effect desorption of at least a portion of said sorbate gas from the solid-phase physical sorbent medium under dispensing conditions including a pressure exterior of said vessel below said interior pressure.

15. The apparatus of claim 1, wherein the gaseous hydride decomposes at room temperature.

16. The apparatus of claim 1, wherein the gaseous hydride generates hydrogen gas and metal upon decomposition.

17. The apparatus of claim 16, wherein the metal comprises a species selected from the group consisting of silicon, germanium, boron and antimony.

18. The apparatus of claim 16, wherein the metal is at least partially regeneratable to the gaseous hydride.

19. The apparatus of claim 1, further comprising a hydrogen-containing source communicatively connected to the collection portion of the decomposition chamber.

20. The apparatus of claim 19, wherein the hydrogen-containing source supplies hydrogen to the decomposition chamber to re-hydride at least a portion of the metal contained therein.

21. The apparatus of claim 19, wherein the gaseous hydride comprises a species selected from the group consisting of silane, germane, stibine and diborane.

22. The apparatus of claim 19, wherein the hydrogen gas permeable membrane is selective for hydrogen over the sorbate gas.

23. The apparatus of claim 19, wherein the hydrogen gas permeable membrane comprises perfluorosulfonic acid.

24. The apparatus of claim 19, wherein the gaseous hydride decomposes at room temperature.

25. A method for generating hydrogen gas by the decomposition of a gaseous hydride, said method comprising:
   (a) providing an apparatus according to claim 1, wherein said gaseous hydride is adsorbed on a solid-phase physical sorbent medium:
   (b) desorbing at least a portion of said gaseous hydride from the solid-phase physical sorbent medium;
   (c) flowing the gaseous hydride from the storage and dispensing vessel to the decomposition chamber; and
   (d) decomposing the gaseous hydride in the decomposition chamber to generate hydrogen gas.

26. The method of claim 25, wherein the gaseous hydride is desorbed from the solid-phase physical sorbent medium by reduced pressure desorption.

27. The method of claim 25, wherein the gaseous hydride is desorbed from the solid-phase physical sorbent medium by thermally-enhanced desorption.

28. The method of claim 25, wherein the gaseous hydride comprises a species selected from the group consisting of silane, germane, stibine and diborane.

29. The method of claim 25, wherein the gaseous hydride comprises silane.

30. The method of claim 25, wherein the solid-phase physical sorbent medium comprises a material selected from the group consisting of silica, carbon molecular sieves, alumina, macroreticulate polymers, kieselguhr, carbon, and aluminosilicates.

31. The method of claim 25, wherein the hydrogen gas permeable membrane is selective for hydrogen over the gaseous hydride.

32. The method of claim 25, wherein the hydrogen gas permeable membrane comprises perfluorosulfonic acid.

33. The method of claim 25, further comprising flowing the hydrogen gas into a fuel cell that is communicatively connected to the collection portion of the decomposition chamber.

34. The method of claim 25, wherein the storage and dispensing vessel comprises a dispensing assembly.

35. The method of claim 34, wherein the dispensing assembly comprises at least one gas regulator positioned between the storage and dispensing vessel and the decomposition chamber.

36. The method of claim 34, wherein the dispensing assembly comprises at least one gas regulator disposed within the storage and dispensing vessel.

37. The method of claim 25, wherein the sorbate gas decomposes at room temperature.

38. The method of claim 25, wherein the gaseous hydride generates hydrogen gas and metal upon decomposition.

39. The method of claim 38, further comprising regenerating the metal by introducing hydrogen from a hydrogen-containing source to the decomposition chamber to re-hydride the metal.

40. The method of claim 25, further comprising flowing the hydrogen gas to a fuel cell.

41. A method for generating hydrogen gas by the decomposition of a gaseous hydride, for consumption, said method comprising:
  (a) providing an apparatus according to claim 1, with a solid-phase physical sorbent medium disposed in the storage and dispensing vessel:
  (b) physically adsorbing a gaseous hydride on said solid-phase physical sorbent medium;
  (c) desorbing gaseous hydride from said solid-phase physical sorbent medium and passing the gaseous hydride to the decomposition portion of the decomposition chamber;
  (d) decomposing at least a portion of said gaseous hydride to form hydrogen gas; and
  (e) flowing the hydrogen gas from the collection portion of the decomposition chamber to a hydrogen gas consuming unit.

42. The method of claim 41, wherein the gaseous hydride comprises a species selected from the group consisting of silane, germane, stibine and diborane.

43. The method of claim 41, wherein the solid-phase physical sorbent medium disposed in said vessel comprises a material selected from the group consisting of silica, carbon molecular sieves, alumina, macroreticulate polymers, kieselguhr, carbon, and aluminosilicates.

44. The method of claim 41, wherein the gas permeable membrane is selective for hydrogen gas over the sorbate gas.

45. The method of claim 41, wherein the gas permeable membrane comprises perfluorosulfonic acid.

46. The method of claim 41, wherein the hydrogen gas consuming unit comprises a fuel cell.

47. The method of claim 41, wherein the sorbate gas decomposes at room temperature.

* * * * *

UNITED STATES PATENT AND TRADEMARK OFFICE
CERTIFICATE OF CORRECTION

PATENT NO. : 7,780,747 B2  
APPLICATION NO. : 10/575556  
DATED : August 24, 2010  
INVENTOR(S) : J. Donald Carruthers Page 1 of 1

It is certified that error appears in the above-identified patent and that said Letters Patent is hereby corrected as shown below:

On the Title Page add: Item (60) -- Related U.S. Application Data
   Provisional application No. 60/510,983, filed on Oct. 14, 2003. --.

In the Specifications:

Column 2, line 26, "Bekkedabl" should be -- Bekkedahl --.

Column 2, line 31, "42534246" should be -- 4253-4246 --.

Signed and Sealed this  
Nineteenth Day of July, 2011

David J. Kappos  
*Director of the United States Patent and Trademark Office*